United States Patent [19]
Barr et al.

[11] Patent Number: 5,735,036
[45] Date of Patent: Apr. 7, 1998

[54] LAPPING PROCESS FOR MINIMIZING SHORTS AND ELEMENT RECESSION AT MAGNETIC HEAD AIR BEARING SURFACE

[75] Inventors: Robert Owen Barr, San Jose; Alain M. Desouches, Santa Cruz; John P. Herber, Watsonville; Robert Glenn Biskeborn, Hollister; Carol Y. Inouye, San Jose; David John Seagle; Albert John Wallash, both of Morgan Hill; Glen Adam Garfunkel; Sanford Joel Lewis, both of Palo Alto, all of Calif.

[73] Assignee: International Business Machines Corporation, Armonk, N.Y.

[21] Appl. No.: 476,787

[22] Filed: Jun. 7, 1995

Related U.S. Application Data

[63] Continuation-in-part of Ser. No. 358,124, Dec. 16, 1994, Pat. No. 5,603,156.

[51] Int. Cl.⁶ .................. H01F 7/06; G11B 5/42
[52] U.S. Cl. .................. 29/603.12; 29/603.17; 451/259
[58] Field of Search ............ 29/603.12, 603.16, 29/603.17, 603.15, 56.5; 451/5, 11, 259, 272

[56] References Cited

U.S. PATENT DOCUMENTS

| | | |
|---|---|---|
| 3,685,216 | 8/1972 | Frey et al. .................. 451/56 |
| 4,010,574 | 3/1977 | Feierabend et al. .................. 451/272 |
| 4,129,937 | 12/1978 | Knutson et al. .................. 29/603.12 |
| 4,226,018 | 10/1980 | Nakanishi et al. .................. 29/603.12 |
| 4,435,736 | 3/1984 | Herman .................. 29/603.12 X |
| 4,536,992 | 8/1985 | Hennenfent et al. .................. 451/259 |
| 4,759,118 | 7/1988 | Nakashima .................. 29/603.14 |
| 4,785,366 | 11/1988 | Krounbi et al. .................. 360/113 |
| 4,912,883 | 4/1990 | Chang et al. .................. 51/165 R |
| 4,914,868 | 4/1990 | Church et al. .................. 51/165.71 |
| 5,095,613 | 3/1992 | Hussinger et al. .................. 29/603.17 |
| 5,136,775 | 8/1992 | Onoe et al. .................. 29/603.12 |
| 5,203,119 | 4/1993 | Cole .................. 451/11 |
| 5,206,590 | 4/1993 | Dieny et al. .................. 324/252 |
| 5,463,805 | 11/1995 | Mowry et al. .................. 29/603.09 |

*Primary Examiner*—Larry I. Schwartz
*Assistant Examiner*—Khan Nguyen
*Attorney, Agent, or Firm*—Baker, Maxham, Jester & Meador

[57] ABSTRACT

A method of lapping the air bearing surface of a magnetoresistive head which minimizes the likelihood of interelement shorts at the air bearing surface is described. In a final, linear lapping phase, the air bearing surface is lapped back and forth parallel to the longitudinal axis of the head elements in an oscillatory path across a stationary lapping surface. Any scratches or smears of the elements will be along the length of the elements rather than transverse to the elements. Any transverse scratches or smears occurring in earlier lapping phases will be removed during the linear lapping phase.

15 Claims, 9 Drawing Sheets

LAPPING PROCESS FOR MINIMIZING SHORTS AND ELEMENT RECESSION AT MAGNETIC HEAD AIR BEARING SURFACE

RELATED APPLICATION

This application is a continuation-in-part of U.S. patent application Ser. No. 08/358,124, filed on Dec. 16, 1994, U.S. Pat. No. 5,603,156.

BACKGROUND OF THE INVENTION

The present invention relates to a method and apparatus for the manufacture of thin film magnetic transducers and, more particularly, to a lapping process which minimizes interelement shorting at the air bearing surface of a magnetoresistive read transducer.

In high speed data processing systems, magnetic recording has been employed for large memory capacity requirements. In magnetic disk drive systems, data is read from and written onto magnetic recording media utilizing magnetic transducers commonly referred to as magnetic heads. Typically, one or more magnetic recording disks are mounted on a spindle such that the disks can rotate to permit the magnetic head mounted on a moveable arm to be positioned closely adjacent to the disk surface to read or write information thereon.

During operation of the disk drive system, an actuator mechanism moves the magnetic transducer to a desired radial position on the surface of the rotating disk where the head electromagnetically reads or writes data. Usually, the head is integrally mounted in a carrier or support referred to as a "slider". A slider generally serves to mechanically support the head and any electrical connections between the head and the rest of the disk drive system. The slider is aerodynamically shaped to glide over moving air and therefore to maintain a uniform distance from the surface of the rotating disk, thereby preventing the head from undesirably contacting the disk.

Typically, a slider is formed with two parallel rails having a recessed area between the rails and with each rail having a ramp at one end. The surface of each rail that glides over the disk surface during operation is known as the air bearing surface.

A head is typically an inductive electromagnetic device including magnetic pole pieces which read the data from or write the data onto the recording media surface. Alternatively, the magnetic head may include a magnetoresistive (MR) read element for separately reading the recorded data, with the inductive element serving to only write the data. In either case, the inductive element magnetic pole pieces and MR read elements terminate on the air bearing surface and function to electromagnetically interact with the data contained in the magnetic recording disk.

In manufacturing such read/write heads, a large number of sliders are fabricated from a single wafer having rows of the magnetic transducers deposited simultaneously on the wafer surface using semiconductor-type process methods. After deposition of the heads is complete, single-row bars are sliced from the wafer, each bar comprising a row of units which can be further processed into sliders having one or more magnetic transducers on their end faces. Each row bar is bonded to a fixture or tool where the bar is processed and then further diced, i.e., separated, into individual sliders, each slider having at least one magnetic head terminating at the slider air bearing surface.

In order to achieve maximum efficiency from the magnetic heads, the sensing elements must have a pole tip height dimension, commonly referred to as "throat height" for the thin film inductive elements, or "element height" in the case of MR read elements, which must be maintained within a certain limited tolerance for generating a maximum signal from a given head element. During the row bar processing, it is critical to grind or lap the bar to a desired thickness in order to achieve the desired throat height and MR element height.

Prior art conventional lapping processes utilize either osciilatory or rotary motion of the work piece (i.e., the row bar) across either a rotating or oscillating lapping plate to provide a random motion of the work piece over the lapping plate and randomize plate imperfections across the head surface in the course of lapping. For example, see U.S. Pat. No. 4,536,992 granted to Hennenfent on Aug. 27, 1985 wherein a work piece is supported by the free end of a pivotally mounted arm on the surface of a rotating lapping plate. During the lap process, the motion of abrasive grit carried on the surface of the lapping plate is typically transverse to (i.e. across) the magnetic head elements exposed at the slider air bearing surface. In magnetic heads, particularly MR heads, the electrically active components exposed at the air bearing surface are made of relatively soft (i.e. ductile) materials. During the lapping process, these electrically active components can scratch and smear into other components causing electrical shorts and degraded head performance. With high density recording MR heads, the smearing becomes severe enough to result in substantial manufacturing yield loss.

The prior art lapping process also causes different materials exposed at the slider air bearing surface to lap to different depths resulting in recession of the critical head elements relative to the air bearing surface and thus poor head performance because of increased spacing between the critical elements and the recording disk. This recession is further aggravated by the random motion of the lapping plate surface across the exposed head elements.

SUMMARY OF THE INVENTION

Accordingly, it is a primary object of the present invention to provide a head assembly fabrication apparatus which minimizes electrical shorts resulting from smearing of the electrically active elements at the air bearing surface during lapping of the air bearing surface.

Another object of the present invention is to provide a head assembly fabrication method and apparatus which reduces the magnitude of recession of the critical head elements at the air bearing surface during lapping.

In view of the foregoing objects, the present invention provides a lapping method and apparatus by which magnetic heads can be lapped with improved surface quality, less sensitivity to electrical shorts due to smears and reduced surface height difference (recession) between the head elements exposed at the slider air bearing surface. The prior art lapping process maintains a work piece against the surface of a lapping plate providing random motion between the work piece and the lapping plate surface. The lapping process proceeds at a succession of two steps or phases in which phase 1 is a rough lapping phase using a diamond slurry, followed by a second phase or polishing phase that maintains the same mechanical motion between the work piece and lapping plate as in phase 1 but utilizing only the lapping plate to polish the work piece surface and clean up any deep texture marks resulting from the diamond slurry phase. During the polishing phase a conductive liquid, such as ethylene glycol, is utilized to provide lubrication and minimize any buildup of static charge. The lapping process of the present invention adds a third phase (i.e., a "linear lap phase") to the prior art lapping process. In the linear lap phase, the same liquid interface used in the second phase between the lapping plate and the work piece is maintained, but without lapping plate motion by the lapping plate. Instead, the work piece (i.e., the row bar) is moved back and forth with an oscillatory motion along its length over the same, small area of the lapping plate, parallel to the plane of the magnetic head elements exposed at the air bearing surface. The back and forth oscillatory motion of the bar parallel to the plane of the exposed head elements results in a longer critical smear distance thus reducing or eliminating electrical shorts formed during this lapping phase. Further, since one to several tenths of a micron of material is removed during the oscillatory phase, any smears resulting from the phase 1 and/or phase 2 lapping will also be removed.

In another embodiment of the present invention, a fourth phase is included in the inventive method. This fourth phase reduces surface distortions in the lapped surface of row bars. Such surface distortions may be caused during the linear lap phase described above by irregularities in the surface of the lapping plate. For example, micro-facets and "roll-off" may occur on portions of the lapped surface of a row bar in the linear lap phase due to local curvature in the surface of the lapping plate. The fourth phase also reduces the undesirable effect on the row bar of scratches on the surface of the lapping plate or other damage to the surface of the lapping plate which may have resulted from earlier rougher phases of the lapping process. For example, if during the previous linear lap phase, a defect in the lapping plate moves repeatedly over one portion of the row bar, deep linear traces or discontinuities in the surface flatness may form along the air bearing surface of sliders which are produced from the row bar.

In accordance with the present invention, the fourth phase preferably includes 5 steps, each of which preferably occur in a repetitive sequential order. During the steps of the fourth phase, the row bar preferably continues to move back and fourth in the oscillatory motion of the linear lap phase. A position sensor placed at a reference position along the oscillatory motion of the row bar is preferably used to synchronize the start of the fourth phase with the motion of the row bar.

In the first step of the fourth phase, the lapping plate is rigidly locked in position, so that only the row bar is in motion. The pressure that was exerted on the row bar during the linear lap phase remains unchanged during the first step of the fourth phase. The sensor attempts to detect the presence of the row bar at the reference position. When the sensor detects that the row bar is at the reference position, the second step begins. In the second step, the pressure exerted on the row bar during the linear lap phase is reduced to a reference pressure (such as the minimum pressure required to maintain contact between the row bar and the lapping plate). A predetermined time later, the third step begins. In the third step, a predetermined pressure profile is implemented. Implementing the pressure profile ensures that the pressure exerted on the row bar is varied in a precisely controlled manner. Once the pressure profile has been implemented for a predetermined amount of time, the fourth step begins. In the fourth step, the pressure is reduced to the minimum required to maintain contact between the row bar and the lapping plate. In a fifth step, the lapping plate is unlocked and rotated. In one alternative embodiment of the present invention, the lapping plate is moved slightly in a straight line in any direction parallel with the lapping surface, but not parallel with the motion of the row bar. In another alternative embodiment, the lapping plate is both rotated and moved linearly. The lapping plate is again locked into position. The minimum pressure is maintained between the row bar and the lapping plate until the row bar has returned to the starting position. This sequence is preferably repeated a predetermined number of times in order to eliminate any distortions to the polished surface of the row bar which may have resulted during the first linear lap phase.

BRIEF DESCRIPTION OF THE PREFERRED EMBODIMENTS

The foregoing and other objects, features and advantages of the present invention will be apparent from the following detailed description of the preferred embodiments of the invention, reference being made to the accompanying drawing in which like reference numerals indicate like parts and in which.

DETAILED DESCRIPTION OF THE PREFERRED EMBODIMENTS

Figure 1A:
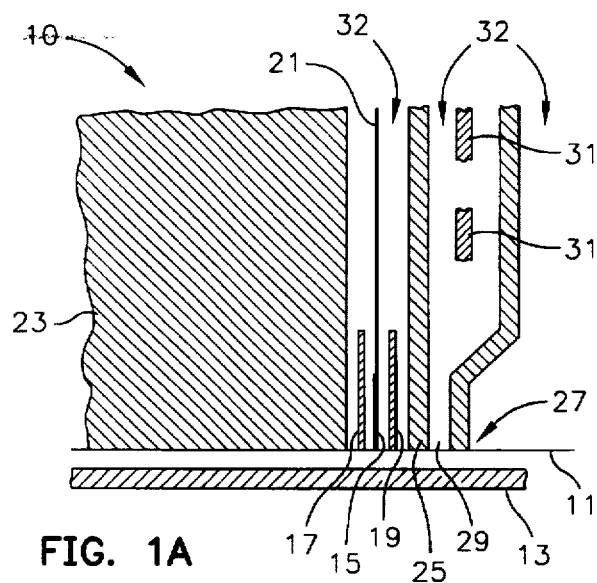
FIGS. 1A and 1B are simplified diagrams of a MR read/inductive write magnetic transducer illustrating the transducer elements.
Figure 1B:
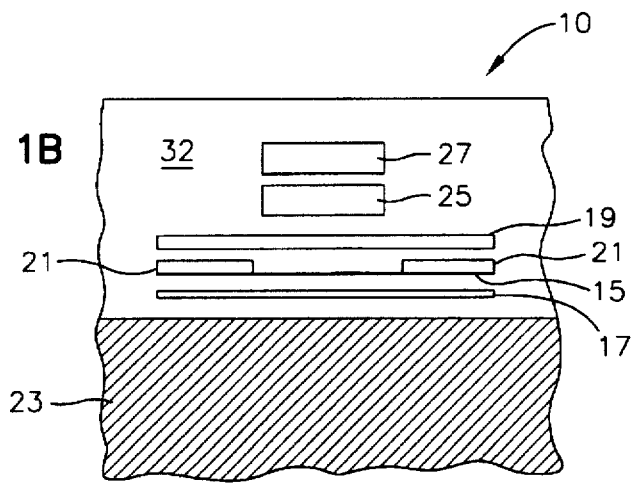
Figure 2:
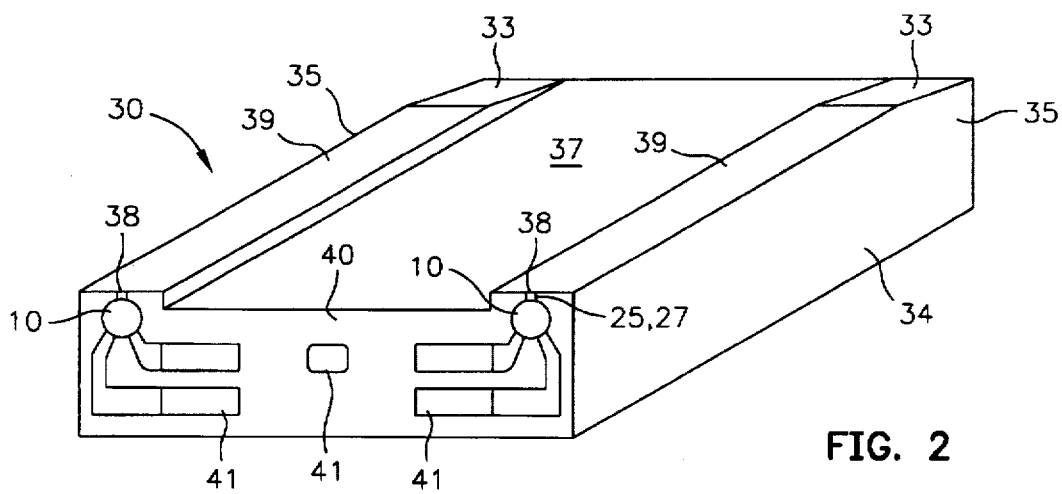
FIG. 2 is a perspective view of a 2-rail design thin film head slider.

Referring now to FIGS. 1A and 1B, FIG. 1A illustrates a portion of a magnetoresistive (MR) read/inductive write magnetic head 10 shown in transducing relationship with a rotating magnetic recording disk 13 such that the head air bearing surface 11 (ABS) is disposed in facing relationship with, and slightly above, the disk recording surface. FIG. 1B shows the magnetic head 10 from the air bearing surface 11 illustrating the head read/write elements exposed at the air bearing surface. Typically, such a head 10 includes an MR read assembly and an inductive write assembly formed adjacent one another on a substrate 23 surface. The substrate surface is typically the vertical surface forming the trailing end of a slider 30 (as shown in FIG. 2) carrying the magnetic head. The MR read assembly comprises an MR sensing element 15 fabricated of a ferromagnetic material, such as a nickel iron (NiFe) alloy, for example, which is enclosed by first and second magnetic shield elements 17 and 19, respectively. The MR sensing element can comprise a single layer of NiFe, commonly referred to as permalloy. More typically, the MR sensing element will comprise a multilayer magnetic structure, including magnetic bias layers, of the type described in U.S. Pat. No. 4,785,366 or of the type described in U.S. Pat. No. 5,206,590, utilizing the giant MR effect. The shield elements 17 and 19 are generally fabricated of a highly permeable magnetic material, such as permalloy or Sendust, a trialloy of aluminum-silicon-iron. The magnetic shield elements 17 and 19 minimize or eliminate magnetic interference effecting the MR element 15 thereby eliminating extraneous electrical pulses. Electrically conductive leads 21, generally of copper (Cu) or other suitable conductive materials, attached electrically at the end portions of the MR element 15 couple the MR element to external circuitry (not shown) to provide a means for sensing the electrical resistance of the MR element.

The MR read assembly is formed by vacuum deposition techniques, such as sputter deposition, for example, on the substrate 31. The various elements of the MR assembly are surrounded and insulated from each other by layers 32 of insulating material, such as silicon dioxide or aluminum oxide (alumina), for example.

The inductive write assembly comprises a lower of first pole piece 25 and an upper or second pole piece 27. The first and second pole pieces 25, 27 are made of a highly permeable magnetic material such as NiFe, for example, and form a magnetic circuit magnetically connected together at a back gap portion (not shown) with the first and second pole pieces 25 and 27 forming a magnetic gap 29 at the air bearing surface 11. One or more layers of electrical conductors 31, generally made of electroplated copper, for example, form an inductive coil disposed between the first and second pole pieces 25, 27. The inductive coil is also connected to external circuitry via conductive leads (not shown). The pole pieces 25, 27 and inductive coil conductors 31 are fabricated by well known processes such as electroplating or sputter deposition, for example. The pole pieces are insulated electrically from the inductive coil and the MR read assembly by layers 32 of insulating material. Additionally, the entire assembly is covered with a capping layer of insulating and protective dielectric material 32.

The magnetic head 10 as shown in FIGS. 1A and 1B is sometimes referred to as a "piggyback" head. An alternative configuration for magnetic head 10 is referred to as a "merged" head (not shown) wherein the second MR magnetic shield element 19 is merged with the inductive write assembly first pole piece 25 to form a single element which performs the functions of both elements.

As seen more clearly in FIG. 1B, the MR read assembly magnetic shield elements 17 and 19, the MR read element 15 and its lead conductors 21 and both inductive pole pieces 25 and 27 terminate in or are exposed at the magnetic air bearing surface 11.

Referring now also to FIG. 2, a typical 2-rail thin film head slider 30 is illustrated. The slider 30 is generally rectangular in shape. It consists of two portions, i.e., a slider portion 34 and a head portion 40 formed on an end face of the slider portion 34. Typically this end face of the slider will constitute the slider trailing edge when the slider is suspended above and adjacent a rotating record disk.

The slider portion 34, which constitutes the bulk of the thin film head slider 30, is made of a ceramic material such as $Al_2O_3$-TiC or other suitable material. This portion 34 comprises, in general, two parallel rails 35 on both sides of a recessed face 37 of the slider 30. The top surface 39 of each rail 35 constitutes an air bearing surface of the slider 30. At the end of the air bearing surface 39, opposite the head portion 40, is a slope or ramp 33. The rails 35, the recessed face 37 and the air bearing surfaces 39 are all important structural features which enable the head portion 40 to "fly" a short distance from or above the surface of a magnetic disk.

The head portion 40 typically is a thin layer of alumina formed on the trailing edge face of the slider portion 34 in which one or more magnetic heads 10 are embedded as described above with references to FIGS. 1A and B. Electrical terminal pads 41 are provided at the surface of the alumina layer to provide electrical connection for the magnetic head elements. Typically one magnetic head 10 will be disposed near the center line of each rail 35 and terminate at the air bearing surface 39, as described above. While only one head 10 is actually used, two or more magnetic heads 10 may be fabricated on the head portion 40 to provide a higher manufacturing yield.

Figure 3:
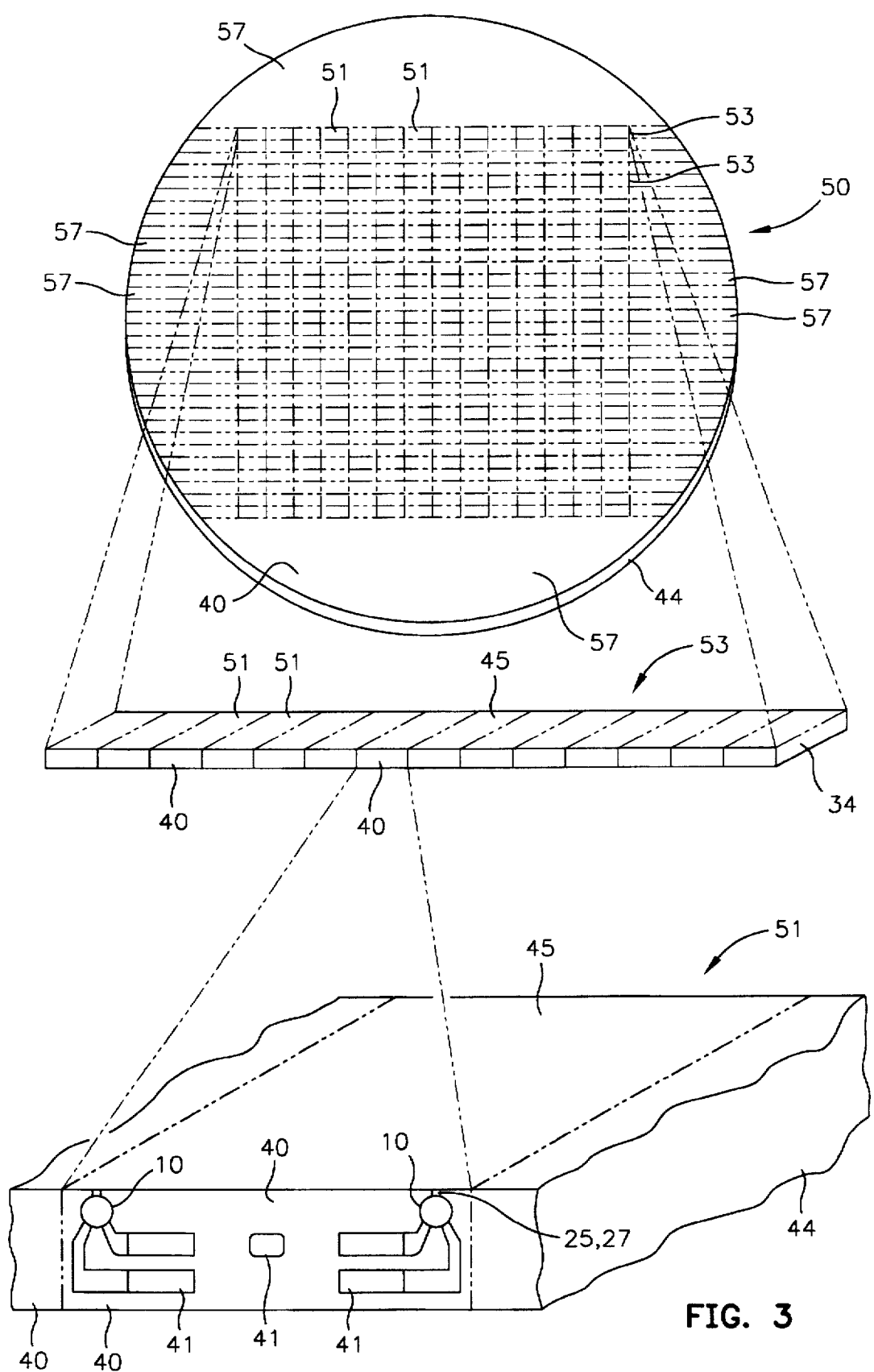
FIG. 3 is a perspective view of a wafer element having a plurality of magnetic heads fabricated thereon in rows and depicting the detailed structure of a row and a slider.
Figure 4:
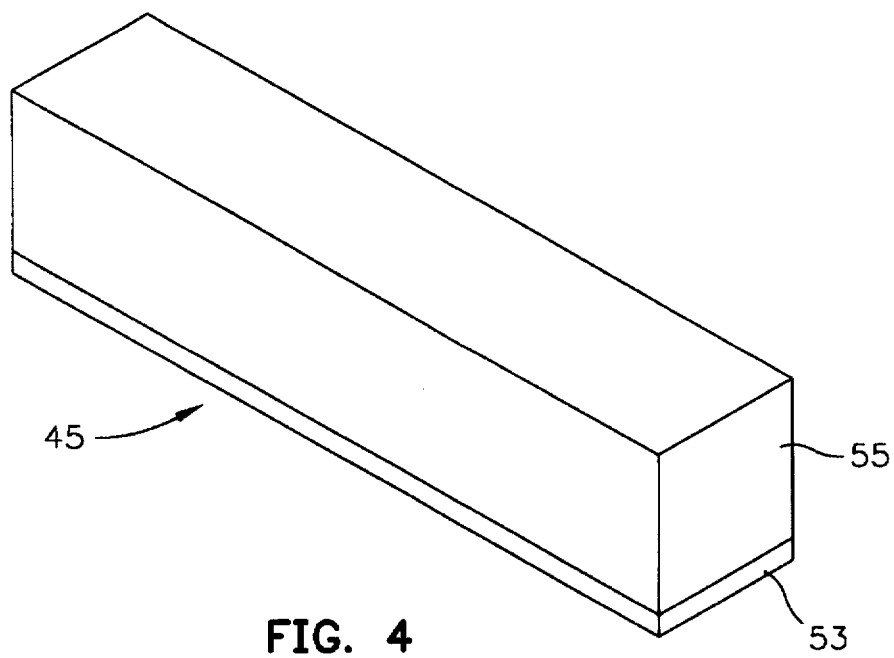
FIG. 4 is a perspective view illustrating a slider row bar attached to a lapping tool.

Referring now also to FIG. 3, the above described two rail thin film head slider 30 has been fabricated from a preprocessed wafer 50 as shown in FIG. 3. The wafer 50 comprises a wafer substrate 44 made of $Al_2O_3$-TiC, and is covered by thin layer 40 of alumina. The magnetic head devices 10 are formed in the layer 40. The magnetic heads 10 are arranged in rows and are identically oriented. Typically, the thickness of the wafer substrate 44 is equal to the length of the finished slider 30.

More specifically, the wafer 50 comprises a matrix of slider units 51 arranged in rows 53 which when fully processed will become sliders 30. The view shown in FIG. 3 is an end view of the individual slider traits 51, the magnetic heads 10 having been formed on the ends of the slider units 51 exposed in this view. As shown in FIG. 3, a plurality of identical row bars 53 each of which comprises a row of identical slider units 51, together with superfluous sections, such as top and bottom sections 57 where no slider units are formed constitute the wafer 50. A wafer may be fabricated to contain any desirable number of rows 53 of slider units 51 and any desirable number of slider units 51 in each row depending, of course, on the size of the wafer and the size of the sliders.

The slider unit 51 shown in FIG. 3 is identical with the finished slider 30 shown in FIG. 2 except that the rails 35 and recessed face 37 are not yet formed and the throat height for the poles 25, 27 and the MR head elements are greater in the unfinished slider unit 51. Since the throat height for the poles 25, 27 and the MR head elements in each slider unit 51 is greater than in a finished slider 30, lapping of the face 45 of each slider unit 30 in a controlled manner is accomplished to obtain a slider 30 with the desired throat and element heights. The desired throat heights and MR head element heights are achieved by the provision of lapping guides at the time the wafer is fabricated. The lapping guides are then used as indicators of element height during the lapping process for the slider units 51. The final height of the MR element is typically determined by measuring the resistance of the MR element itself. See, for example, U.S. Pat. Nos. 4,914,868 and 4,912,883.

When fabrication of the magnetic heads on the slider units 51 is complete at the wafer level, the wafer 50 is sliced into bars 53, each bar constituting a row of slider units 51. The separated row bar 53 is then attached or bonded to a lapping fixture or tool 55 in such a manner that the slider unit 51 face 45 is exposed for lapping as well as other mechanical processing operations to be performed on face 45 while the row bar is affixed to the tool 55. The exposed face 45 of the row bar 53 is subjected to a series of etching, grinding and lapping processes to define the air bearing surface rails 35, to form ramps 33, to create the recessed slider face 37 between the air bearing surface rails 35 and to obtain a proper throat height for the poles 25, 27 and element heights for the MR head elements. The row bar 53 thus processed is then subjected to a dicing process, i.e., vertical cuts are made in the row 53 to separate the slider units 51, thereby forming the completed slider 30. The rail definition, ramp formation, row dicing and other mechanical processes are well known in the art. The inductive head throat height and MR head element height lapping process will be discussed in more detail below.

Figure 5A:
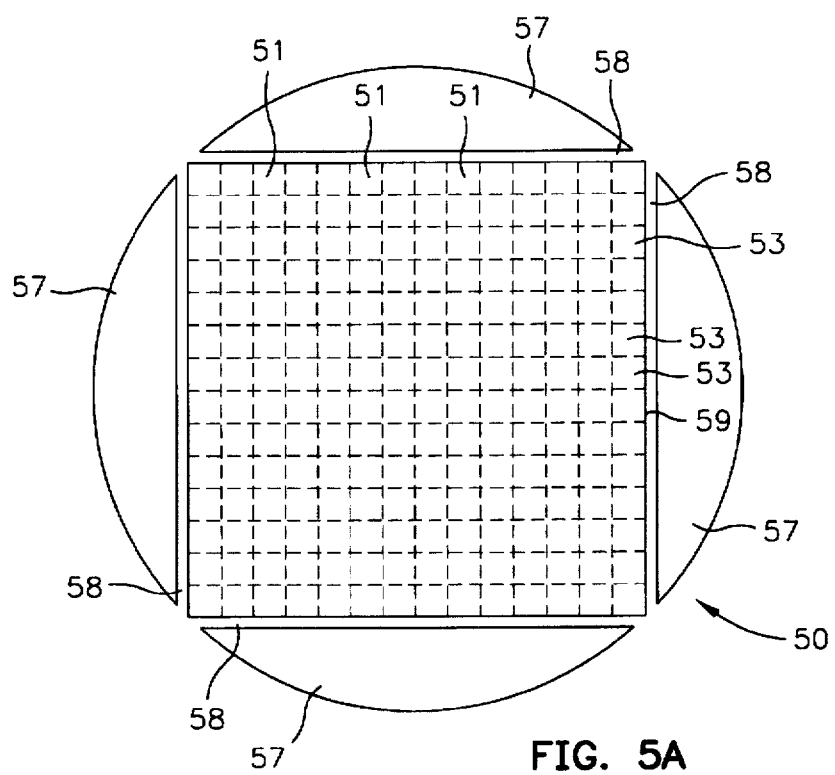
FIG. 5A is a plan view of a wafer element having a plurality of magnetic heads fabricated thereon in rows.
Figure 5B:
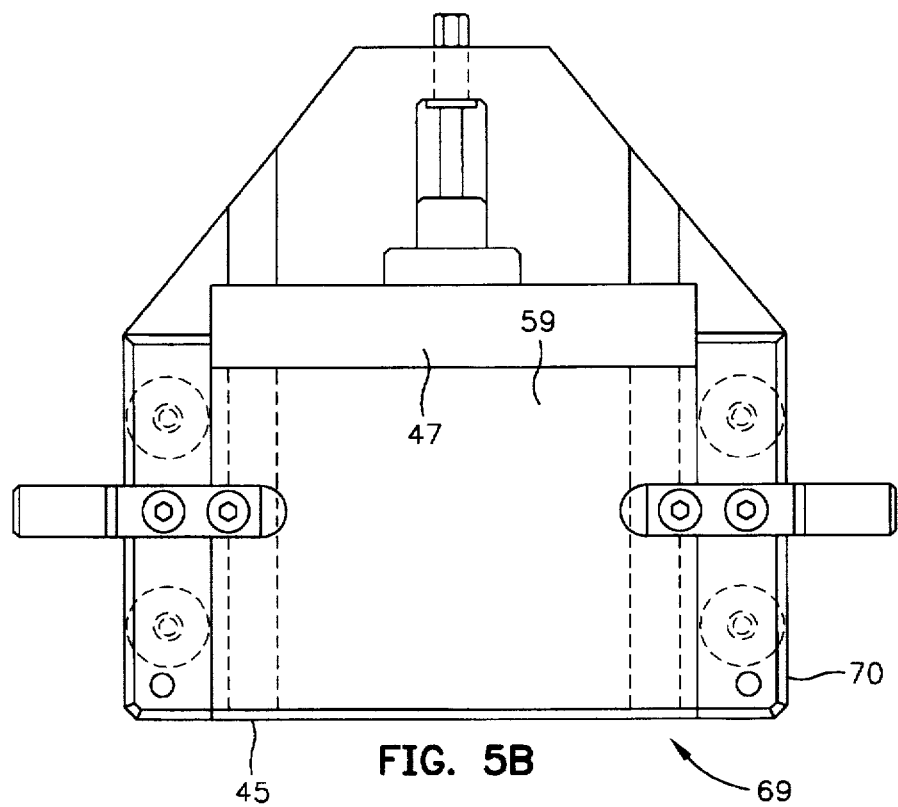
FIG. 5B is a plan view of a lapping tool for holding the wafer element of FIG. 5A during lapping and grinding operations.

Referring now also to FIGS. 5A and 5B, rather than performing the lapping and other process steps required in formation of the air bearing surface for the slider units 51 on individual row bars 53, the entire wafer may be processed one row 53 at a time prior to slicing the row from the wafer. FIG. 5A illustrates a wafer 50 having rows 53 of slider units 51 formed thereon as described above with reference to FIG. 3. Superfluous sections 57 are sliced from the wafer by cuts 58 to form a generally rectangularly-shaped wafer element 59. An edge of the wafer element 59 corresponds to the face 45 for a row 53 of slider units 51.

The wafer element 59 is then bonded to a wafer extension tool 47 at an edge opposite the slider unit face 45. The purpose of the tool 47 is to hold the wafer element 59 as each row 53 is lapped and sliced from the wafer element. Once bonded to the wafer extension tool 47, the wafer element 59 is loaded into a lapping fixture 70 as shown in FIG. 5B. The lapping fixture 70 is conventional in nature and supports the wafer element 59 and tool 47 in accordance with known techniques. When loaded in the lapping fixture 70, the face 45 of a row 53 of slider units is exposed for lapping at the lower end 69 of the lapping fixture. The process of lapping each row 53 of the wafer element 59, then separating the row by slicing is repeated until the last row is lapped and debonded from the tool 47. While only one wafer element 59 is shown in FIG. 5A. The wafer 50 can be separated into two or more smaller elements optimized to achieve minimum internal stress and row bow or to be compatible with a given manufacturing tool set (not shown).

Figure 6:
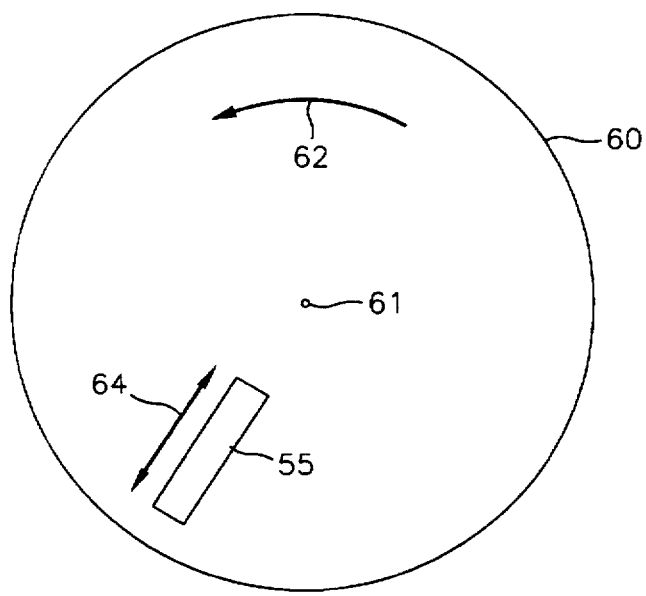
FIG. 6 is a schematic diagram illustrating the lapping process according to the present invention.

Referring now also to FIG. 6, the air bearing surface lapping process comprises three basic phases, a fast or rough grind phase, a fine lap or polish phase and a final linear lap phase. During the lapping process, exposed face 45 of a row bar 53 attached to a lapping tool 55 is maintained in light contact with the surface of a lapping plate 60. The lapping plate 60 typically will have diamond particles or other suitable material embedded in its surface to provide a grinding or polishing action. The lapping plate 60 is rotated about a center spindle 61 by a spindle motor or other means (not shown) as indicated by arrow 62. The lapping tool 55 is maintained in position on the lapping plate 60 by a suspension arm or other means (not shown) which is capable of moving the lapping tool 55 over the surface of the lapping plate 60. During the rough grind phase, the surface of the rotating lapping plate 60 is coated with a diamond slurry which grinds away material from the exposed face 45 of the bar 53 in contact with the lapping plate surface. During the rough grinding phase, as much as several tens of microns of material are quickly removed from the exposed face 45 of the row bar 53. During the fine lap or polishing phase, excess slurry is removed from the surface of the rotating lapping plate 60 so as to polish the exposed surface 45 and clean up any deep texture marks remaining from the rough grind phase. During both the rough grind and fine lap or polishing phases, the lapping plate 60 is rotating as shown by arrow 62 resulting in grinding particles moving across the exposed face of the heads 10 transversely to the longitudinal axis of the head elements. During the fine lap and linear lap phases a conductive liquid, such as ethylene glycol, is utilized on the lapping plate surface to provide lubrication and minimize buildup of static charge. For the final lapping phase, referred to as the linear lap phase, linear relative motion between the head and the lapping surface parallel to the longitudinal axis of the head elements at the air bearing surface is provided. In a preferred embodiment, rotation of the lapping plate 60 is stopped and the lapping tool 55 is moved back and forth across the surface of the stationary lapping plate 60 in an oscillatory motion as indicated by arrow 64. The back and forth motion of the row bar 53 on the surface of the lapping plate 60 is parallel to the longitudinal axis of the inductive poles 25, 27 and the MR head elements 15, 17, 19 and 21 exposed at the head air bearing surface 11. During the linear lap phase wherein several tenths of a micron of material are removed, any smearing of the MR head elements or the inductive head pole transversely across the head air bearing surface resulting from the rotary motion of the lapping plate 60 is removed. Furthermore, since the direction of the back and forth motion is parallel to the longitudinal axis of the head elements, any smearing which may be caused by the linear lap phase is along the longitudinal axis of the head elements and not likely to extend into the critical insulating layer between the MR and shield elements which can cause electrical shorts between the head elements. Therefore the likelihood of interelement shorts at the air bearing surface of the head is minimized and head production yield is increased. Additionally, repeated motion over the same relatively small area of the surface of the lapping plate 60 wears the plate surface smooth in that small region resulting in better surface quality and lower element recession at the air bearing surface 11. It should be noted that the entire lapping process, i.e., the rough grind or fast lap, fine lap and final lap phases, can be completed utilizing the linear back and forth, oscillatory motion between the lapping surface and the head air bearing surface rather than rotary or random motion in the first phases and linear motion only in the final phase.

Figure 7:
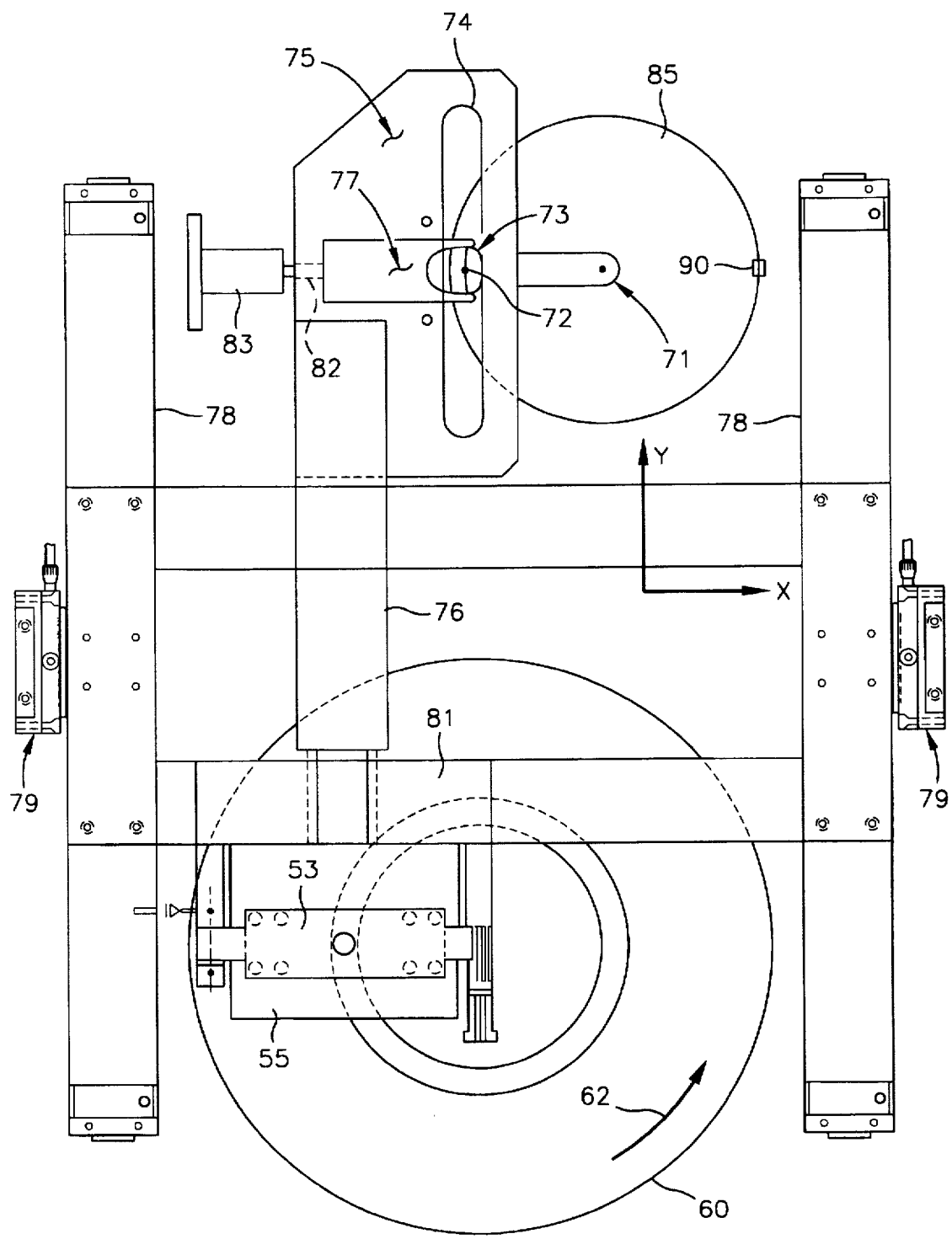
FIG. 7 is a plan view of a preferred embodiment of a linear lapping apparatus implementing the principles of the present invention.

Referring now also to FIG. 7, a plan view of a portion of a lapping apparatus implementing the linear lapping process of the present invention is shown. Lapping tool 55 including a row bar 53 attached thereto, is locked in a lapping fixture 81 such that the exposed face 45 of row bar 53 is maintained in light contact with the surface of a lapping plate 60. The lapping plate 60 is rotatably mounted on a spindle (not shown) and is rotated as shown by arrow 62 by a spindle motor (not shown). The lapping fixture 81 is slidably mounted between Y-axis slide bars 78 and is attached to one end of linkage arm 76. The other end of linkage arm 76 is attached to, or may be an integral part of slot plate 75. Slot plate 75 includes a longitudinal slot 74 formed therein and having its longitudinal axis parallel to the Y-axis of the lapping apparatus. Cam follower 73, attached to one end of a crank arm 71, is disposed within longitudinal slot 74. The other end of crank arm 71 is attached to the output shaft of a crank motor (not shown). The crank motor turns the crank shaft 71 such that a center point 72 of cam follower 73 traces a circular path 85 when the crank motor is rotating the crank arm 71. A cam fork 77 is slideably mounted on slot plate 75 and spring loaded or otherwise biased to engage cam follower 73. Solenoid 83 coupled to cam fork 77 by linkage 82 disengages cam fork 77 from cam follower 73 when energized.

As described above with reference to FIG. 6, during the first two phases of the lapping process, the lapping plate 60 is rotating providing circular relative motion between the lapping tool 55 and the lapping plate 60. Also during the first two lapping phases, the solenoid 83 is de-energized allowing the cam fork 77 to engage the cam follower 73 thus locking cam follower 73 in a set position in longitudinal slot 74. Thus, when the crank arm 71 is rotated, the lapping fixture 81 also rotates in a circular motion relative to the lapping plate 60.

Both the lapping fixture 81 and the lapping plate 60 are simultaneously rotating during the rough grind and fine lap phases of the lapping process. For the final or linear lap phase, rotation of both the lapping plate 60 and the crank arm 71 are terminated and the lapping fixture 81 stopped such that the lapping tool 55 and row bar 53 are positioned at approximately the nine o'clock position over the lapping plate 60 as shown in FIG. 7. Pressure pads 79 are activated using a pneumatic solenoid thus providing pressure against the Y-axis slide bars 78 in a manner similar to a brake pad. The activated pressure pads 79 thus maintain the Y-axis bars 78 in a stationary position. The solenoid 83 is also energized thus retracting and disengaging cam fork 77 from cam follower 73. When the cam fork 77 is fully disengaged from cam follower 73, the cam follower is allowed to move back and forth or oscillate along the full length of the slot 74 formed in the slot plate 75. When the crank arm 71 is then rotated, with the lapping plate 60 not rotating, the lapping tool 81 is moved back and forth across the lapping plate 60 in an oscillatory motion along the lapping apparatus X-axis to provide the linear lap phase as described above with respect to FIG. 6.

Figure 8A:
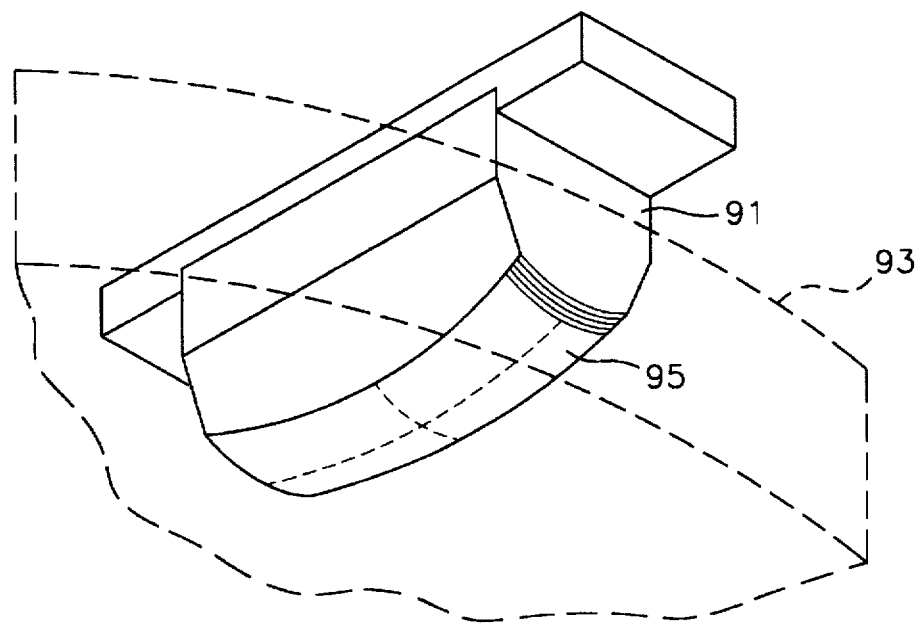
FIGS. 8A and 8B are a view in perspective illustrating different lapping processes for an individual thin film head slider having a contoured air bearing surface.
Figure 8B:
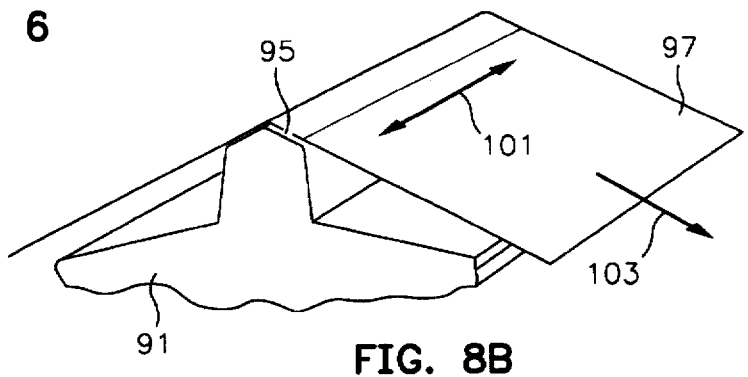
Figure 9:
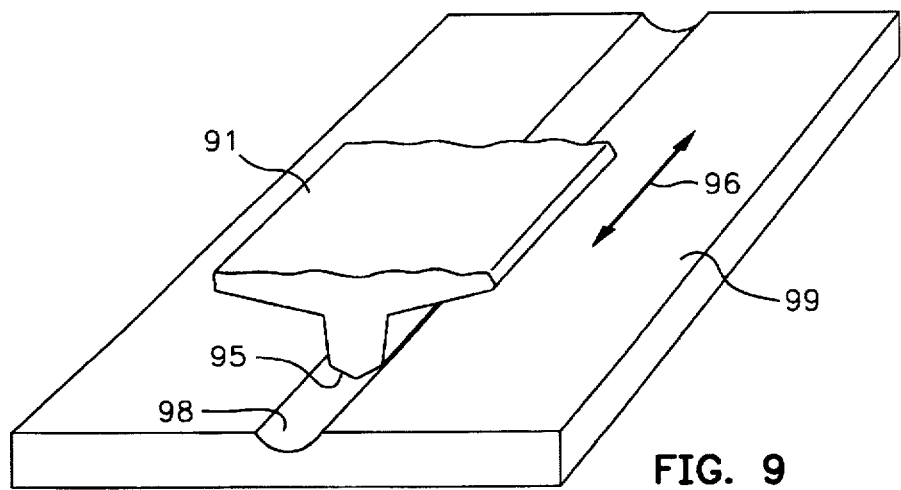
FIG. 9 is a view in perspective illustrating the linear lapping process according to the principles of the present invention for the thin film head slider shown in FIG. 8A.

Referring now also to FIGS. 8A, 8B and 9, in some applications, such as magnetic tape recording heads, the slider air bearing surface will be contoured rather than flat. While heads having contoured air bearing surfaces may be row processed, including lapping, typically contoured heads will be lapped individually. The desired contour may be achieved by one of two processes, or a combination of both. In a first process (as shown in FIG. 8A) a circular bearing lapper apparatus (not shown) rocks the head 91 on a rotating plate 93 coated with a slurry of fine grit that laps a curved surface 95 for the head air bearing surface. The direction of lapping varies as the head rocks and the plate rotates. In a second process, the tape lap process, as shown in FIG. 8B, the head 91 is moved across a tape 97 impregnated with fine diamond particles. The tape 97 is wrapped around the head air bearing surface 95 similar to the wrap of magnetic recording tape in a magnetic recording tape system. By its very nature, the tape lap motion is perpendicular to the longitudinal axis of the head pole tips and MR head elements.

In a manner similar to that described above with reference to FIG. 6, the lapping process for individual sliders having a contoured air bearing surface comprises three basic phases, a fast or rough grind phase, a fine lap or polish phase and a final linear lap phase. The rough grind and fine lap phase proceed as described above with reference to FIGS. 8A and 8B. In one preferred embodiment, the final, linear lap phase utilizes a flat lapping plate 99 having a longitudinal groove 98 formed in the surface of the lapping plate. The radius of the groove 98 is close to the desired radius of the contoured air bearing surface, 95. The depth of the groove 98 is sufficient to accept the entire contoured surface when the lapping is complete and the air bearing surface 95 has achieved the desired contour.

For the final linear lap phase, the head 91 is locked in a lapping fixture (not shown) with the air bearing surface 95 to be lapped placed in the groove 98. A diamond slurry or other suitable grinding medium is also placed in the groove 98 and the lapping fixture moved back and forth in an oscillatory motion along the groove maintaining the slider air bearing surface 95 in light contact with the surface of the groove. The lapping motion is in a direction which is parallel to the longitudinal axis of the head elements exposed at the slider air bearing surface. The linear lap phase continues until up to about a half micron of material has been removed providing a final polish to the slider surface and removing any head element material smears between the elements which may have resulted from the rough grind and fine lap phases.

Alternatively, the radius and depth of the groove 98 may be made slightly greater than the desired contour for the air bearing surface. For the linear lap phase then, a diamond impregnated tape 97 is placed in the groove 98 along with a suitable lubricant and the head 91 positioned in the groove 98 over the tape sandwiching and compressing the tape between the air bearing surface 95 and the surface of the groove 98. The groove is of sufficient depth that when the head 91 compresses the tape in the groove, the tape is wrapped around the entire contoured surface 95. The pressure is distributed evenly on the previously contoured head air bearing surface such that the original contour is maintained during the linear lap phase without producing any faceting, i.e., flat spots. The head 91 is then slid back and forth in the groove over the tape to lap the contour surface.

With continuing reference to FIG. 8B, in another preferred embodiment of the linear lapping process a diamond impregnated lapping tape 97 is wrapped around the head 91 in contact with the contoured air bearing surface 95 and linear relative motion parallel to the longitudinal axis of the head elements is provided. The head 91 is held in a lapping tool (not shown) and moved in a back and forth, oscillatory motion transversely across the lapping tape 97 parallel to the longitudinal axis of the head elements as indicated by arrow 101. During the linear lap phase, the lapping tape 97 is also slowly (relative to the oscillatory transverse motion of the head 91) moved longitudinally across the head surface transverse to the head elements, as indicated by arrow 103. The longitudinal motion of the lapping tape may be at a steady pace or, alternatively, may be intermittent. The longitudinal motion of the lapping tape ensures that the transverse motion of the head 91 across the tape 97 does not wear through the abrasive surface of the tape. Alternatively, during the linear lapping motion, the head 91 is intermittently moved away from the tape interrupting contact with the lapping surface while the tape is moved longitudinally. This insures that no smearing or scratching of the head elements or air bearing surface occurs during the longitudinal movement of the lapping tape transversely across the head air bearing surface.

In accordance with another embodiment of the present invention, referred to hereafter as a "four phase lapping process", a fourth basic phase is added to the previously discussed three basic phases. Accordingly, the first three basic phases are preferably identical to the three basic phases described above (i.e., the fast or rough grind phase, the fine lap or polish phase and the final linear lap phase). Since the additional phase is a second linear lap phase, the final linear lap phase described above will be referred to as a "first linear lap phase" in the context of this embodiment. The additional phase will be referred to as a "second linear lap phase". In the preferred embodiment of the present invention, the second linear lap phase begins at the end of the first linear lap phase.

Figure 10:
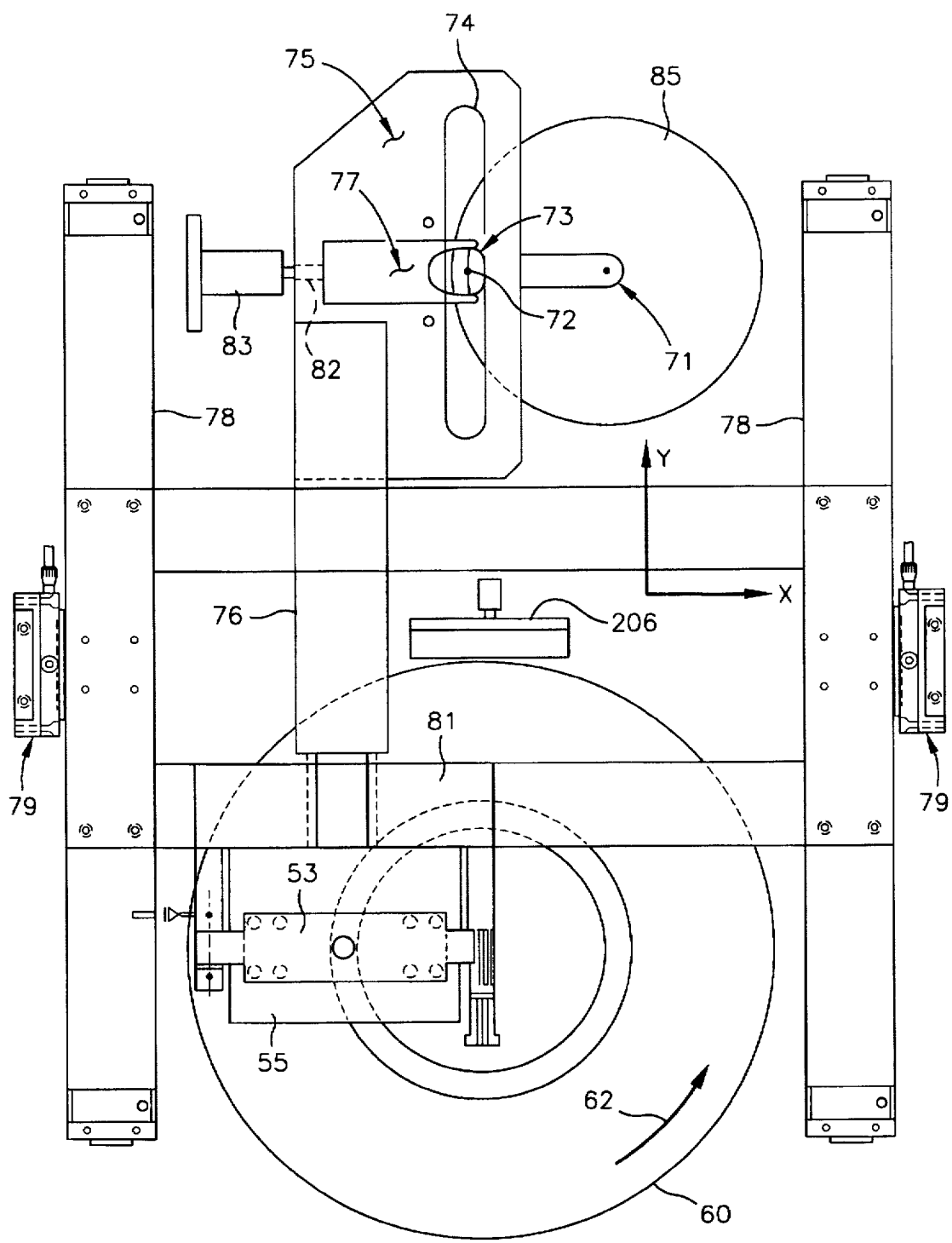
FIG. 10 is a plan view of another embodiment of the linear lapping apparatus implementing the principles of the present invention.

In accordance with one embodiment of the four phase lapping process of the present invention, the lapping apparatus shown in FIG. 10 is preferably used as described above in the first three phases. In the second linear lap phase, the lapping apparatus is used to cause the lapping tool 55 to move back and forth (i.e., oscillate) across the lapping plate 60 in an oscillatory motion along the lapping apparatus X-axis in the manner described above with respect to the first linear lap phase. The lapping apparatus of FIG. 10 is essentially identical to the lapping apparatus shown in FIG. 7. However, a sensor 90 (refer to FIG. 11) is preferably provided in the apparatus of FIG. 10 (not shown in FIG. 10) to sense when the lapping tool 55 is at a particular location (i.e., a "reference location") along the X-axis. In the preferred embodiment, the sensor 90 is an optical sensor that detects the position of the crank shaft 71. Alternatively, the apparatus of FIG. 7 may be used. Also, in an alternative embodiment of the present invention, the lapping plate 60 is mounted on a platform that allows the lapping plate 60 to be moved in a straight line along the Y-axis.

In one embodiment of the present invention, a lapping plate locking device 206 is preferably used to hold the lapping plate 60 rigidly in position during both the first and the second linear lap phase. In one embodiment of the present invention, the locking device 206 is an activated pressure pad that makes contact with the lapping plate 60 to hold the lapping plate stationary, similar to the activated pressure pads 79 described above. In an alternative embodiment, the locking device is a shaft (not shown). The shaft extends into a recess (not shown) in the lapping plate 60.

Figure 11:
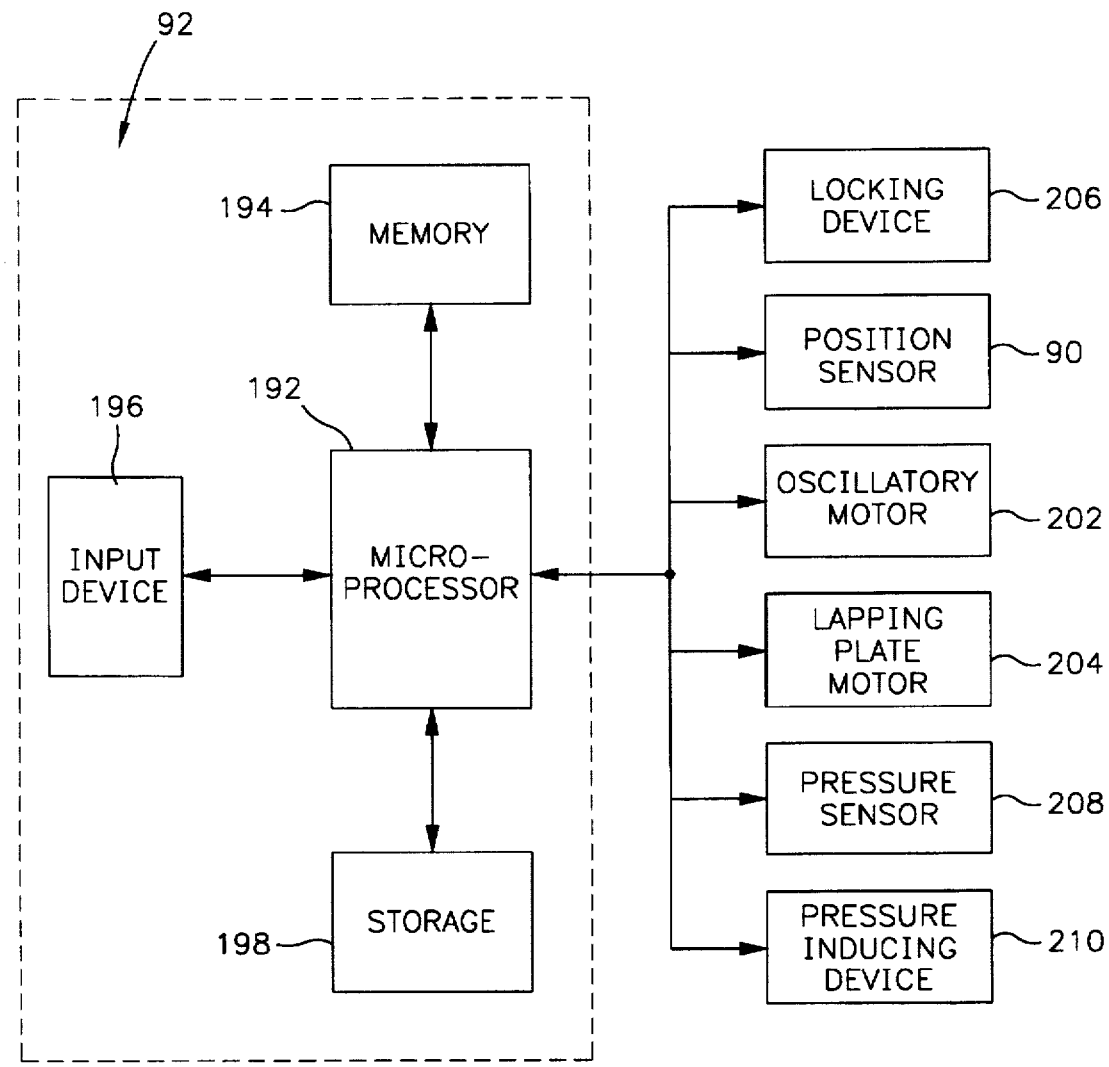
FIG. 11 is an block diagram of some of the components of a lapping apparatus including a control device.

The second linear lap phase includes five steps performed under the control of a control device, such as a conventional IBM AT desktop computer including a microprocessor 192, input device 196 (such as a keyboard), data storage device 198 (such as a magnetic disk drive device), and memory device 194 (such as a static random access memory). FIG. 11 is an block diagram of some of the components of a lapping apparatus including a control device 92. The control device 92 is preferably coupled to the position sensor 90, a first motion generator 202 (such as a crank motor) which causes the row bar 53 to move in a linear oscillatory motion, a lapping plate motion generator 204 (such as a lapping plate spindle motor) which causes the lapping plate 60 to move in a rotary motion, and a conventional pressure inducing device 210 (such as a pneumatic piston) which causes pressure to be exerted between the row bar 53 and the lapping plate 60. In an alternative embodiment of the present invention, the microprocessor 192 is coupled to a sensor 208 that senses the pressure applied between the row bar 53 and the lapping plate 60.

Figure 12:
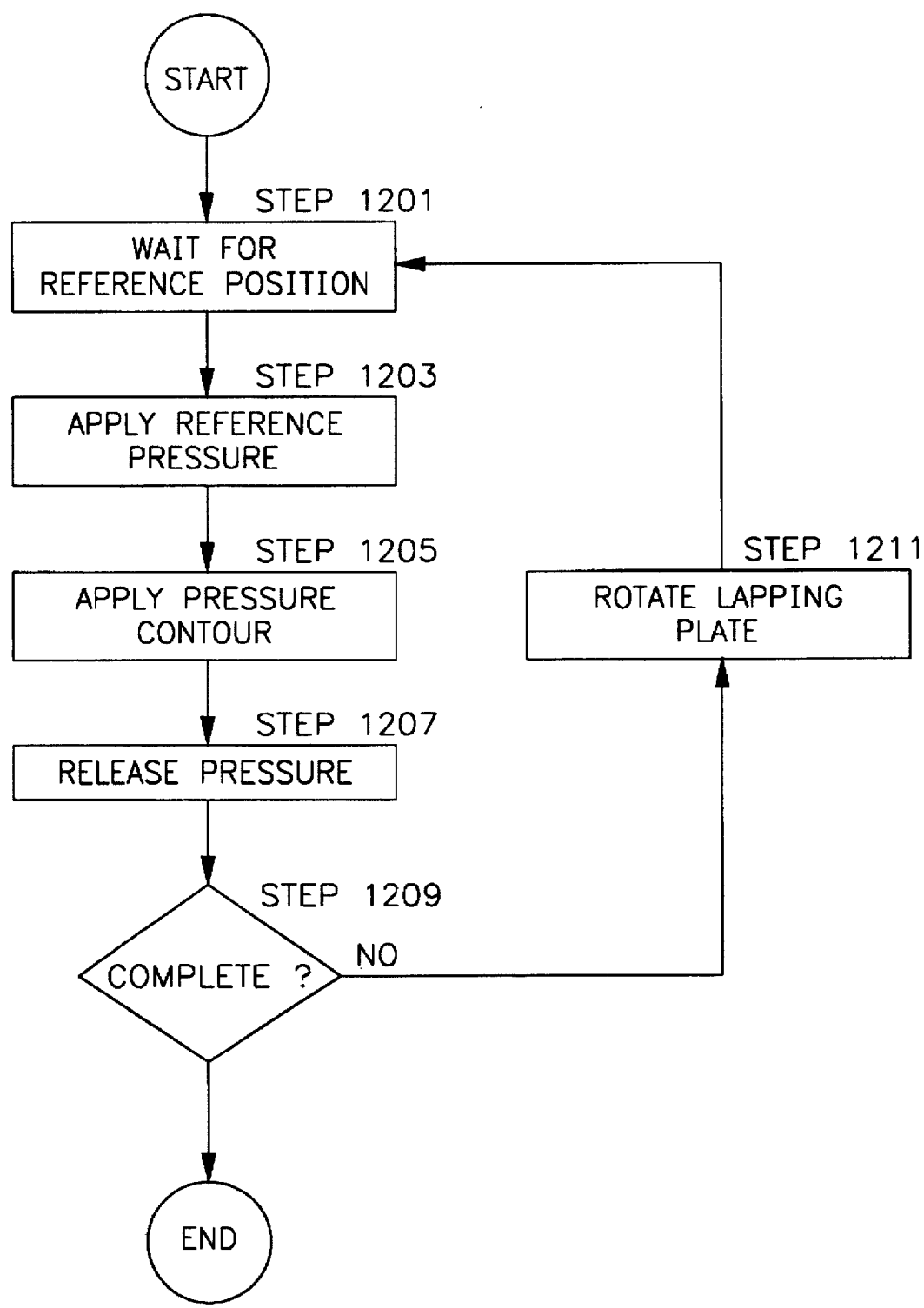
FIG. 12 is a flowchart of the process which preferably occurs during the second linear lap phase of the present invention.

In accordance with the preferred embodiment of the present invention, the control device 92 preferably performs the steps illustrated in FIG. 12 by executing computer program instructions stored in a magnetic storage device, such as the data storage device 198 or the memory 194. In the preferred embodiment, the program instructions are initially stored in the storage device 198, and then loaded into the memory 194 for execution by the microprocessor 192.

A flowchart of the process which preferably occurs during the second linear lap phase is provided in FIG. 12. During the first step, the control device 92 monitors the sensor 90 to determine when the lapping tool 55 is at the reference location (STEP 1201). The interface used in the first linear lap phase (i.e., preferably ethylene glycol) is preferably used between the lapping plate 60 and the row bar 53 throughout the second linear lap phase. Upon detecting that the lapping tool 55 is at the reference location, the control device 92 commands the pressure inducing device 210 to create a predetermined amount of pressure. The phrase "without substantially abrading" in this context means that no change will occur in the contour of the surface of the row bar 53 that would effect the flying characteristics of a magnetic transducer produced from the row bar 53. Conversely, reference to abrading a "substantial" amount of material from a surface refers to abrading a sufficient amount of material to change the contour of the surface in a relatively short amount of time.

In the preferred embodiment of the present invention, it is assumed that the reference pressure is established after a predetermined amount of time has elapsed. That is, the control device 92 is programmed to wait a predetermined amount of time after a command to exert the reference pressure is given to the pressure inducing device 210. The predetermined amount of time is calculated to be long enough to allow the reference pressure to be achieved. In accordance with one embodiment of the present invention, the amount of time is determined by a first timer which is started when the position sensor 90 indicates that the row bar 53 is in the reference position. The control device 92 concurrently commands the pressure inducing device 210 to exert the reference pressure. Alternatively, the control device 92 is coupled to the pressure sensor 208 to detect when the reference pressure has been achieved between the lapping plate 60 and the row bar 53.

Once the control device determines that the reference pressure has been achieved, the control device 92 controls the pressure inducing device 210 to apply a pressure contour (STEP 1205), such as the pressure contour shown in FIG. 13. That is, the pressure that is applied by the pressure inducing device 210 is controlled as a function of time in accordance with a predetermined pressure vs. time curve shown in FIG. 13. The pressure contour shown in FIG. 13 is calculated to modulate the pressure between the lapping plate 60 and the row bar 53, such that the optimum stripe height (or throat height) distribution is maintained. In one embodiment of the present invention, the pressure is reduced to the reference pressure (STEP 1207) a predetermined period of time after the start of STEP 1203. The predetermined period of time is preferably determined by a second timer. In the preferred embodiment, the duration of the second timer is set such that the pressure is reduced approximately at the time the row bar 53 reaches the maximum distance from the reference position and starts to return to back to the reference position. In an alternative embodiment of the present invention, after the pressure contour has been repeated a predetermined number of times, the pressure is reduced. In another alternative embodiment, at the end of one cycle of the pressure contour, the pressure is released. In yet another alternative embodiment, the predetermined period of time is unrelated to the duration of the pressure contour cycle or the motion of the row bar 53.

In the preferred embodiment of the present invention, the control device 92 starts a third timer upon releasing the pressure in STEP 1207 to determine when to begin the next step. Upon expiration of the third timer, a determination is made as to whether the second linear lap phase is complete (STEP 1209). The completion of the second linear lap phase is preferably indicated by the expiration of a predetermined period of time measured from the start of the second linear lap phase (i.e., the start of STEP 1201). This period is preferably measured by a fourth timer. However, in an alternative embodiment of the present invention, the completion is be determined by counting the number of times the position sensor 90 has been contacted. In yet another embodiment, the number of times a particular step of the second linear lap phase has accomplished is counted to determine whether the second linear lap phase is complete.

If the second linear lap phase is not complete (i.e., the third timer expires before the fourth timer has expired) (STEP 1209), then the locking device 206 is released and the lapping plate 60 is preferably rotated approximately 3° (STEP 1211). In an alternative embodiment, the lapping plate 60 may be rotated either more or less than 3°. In the preferred embodiment of the present invention, the microprocessor 192 controls the motion of the lapping plate 60 by commanding the lapping plate motion generator 204. In another alternative embodiment of the present invention, the lapping plate 60 is moved in a direction that is parallel with the surface of the lapping plate, but which is not parallel with the motion of the row bar 53. This repositioning of the lapping plate 60 causes any defects in the lapping plate to be moved with respect to the surface of the row bar 53. Accordingly, the amount of time that a particular irregularity, such as local plate curvature, is in contact with one portion of the surface being lapped is insufficient to cause detectable defects (such as micro-facets and roll-off) to form in the polished surface of the row bar 53. In addition, defects in the lapping plate, such as plate damage and scratches from earlier rougher phases, are not mapped into the surface of the row bar 53, since the surface of the row bar 53 does not go repeatedly over the same defects. Without the movement of the lapping plate in STEP 1209, deep linear traces can form along the row bar 53. Also, flatness discontinuities may form.

In the preferred embodiment of the present invention, less than 0.10 μm of material is removed from the surface of the row bar 53 in the second linear lap phase. The second linear lap phase preferably removes material at a very slow pace due to: (1) the relatively light pressure applied between the lapping plate 60 and the row bar 53, (2) the low abrasive characteristics of the liquid interface between the lapping plate 60 and the row bar 53, and (3) the fact that the lapping plate must be repositioned each cycle of the second linear lap phase. Accordingly, the second linear lap phase is preferably not a substitute for the first linear lap phase described above (during which several tenths of a micron are removed). However, in an alternative embodiment, the first linear lap phase may be eliminated in favor of the second linear lap phase if sufficient time is provided for the surface of the row bar 53 to be sufficiently abraded.

In the preferred embodiment of the present invention, one complete cycle of the second linear lap phase (i.e., each of the five steps 1201–1211) is accomplished in less than the amount of time required for the row bar 53 to return to the reference position from which the process begins. Furthermore, the reference position is preferably at one end of the motion of the row bar 53 (i.e., at the point at which the row bar 53 reverses direction). The pressure contour applied to the row bar 53 in STEP 1205 is preferably applied during the movement of the row bar 53 away from the reference position. The lapping plate 60 is preferably rotated during the movement of the row bar 53 toward the reference position. Accordingly, each cycle of the second linear lap phase is preferably synchronized with the oscillatory motion of the row bar 53. Alternatively, the motion of the row bar 53 may be arbitrary with respect to the sequence of steps performed in the second linear lap phase.

While the present invention has been particularly shown and described with reference to preferred embodiments thereof, it will be understood by those skilled in the art that various changes in form and detail may be made therein without departing from the spirit, scope and teaching of the invention. For example, each of the timers described above may be any conventional timer, such as a conventional software or conventional hardware timer. Furthermore, while the present invention is described as being controlled by a control device, it should be understood that the control device of the present invention may be a microprocessor, mini-computer, mainframe computer, desktop computer, state machine, or dedicated hardware. The control device may be implemented in a single custom semiconductor integrated circuit, a field programmable array, a hybrid integrated circuit, or with discrete components fixed to a substrate, such as a printed circuit board. Furthermore, the apparatus of the present invention may include any lapping equipment that is capable of inducing the equivalent of a first circular motion in the lapping plate and a second circular motion in the row bar 53, and then inducing only a linear motion between the row bar 53 and the lapping plate. For example, in the embodiment of the invention shown in FIG. 10, the linear motion is provided by releasing the cam fork 77 to disengage the cam fork from the cam follower 73. However, in an alternative embodiment of the present invention, the linear motion may be induced by an additional motor dedicated to generating the linear motion. Still further, the particular pressure contour that is implemented during abrading of the row bar 53 in the second linear lap phase may have any particular shape. For example, the pressure may be applied at a constant force over the entire period that the row bar 53 is being abraded. Accordingly, the invention herein disclosed is to be considered merely as illustrative and limited in scope only as specified in the appended claims.

We claim:

1. In a process for batch fabricating magnetic transducers wherein said magnetic transducers are fabricated in rows, said magnetic transducers having a plurality of transducer elements exposed at an air bearing surface thereof, a method for lapping said air bearing surface to provide a desired dimension for said transducer elements, comprising the steps of:

moving said magnetic transducer in an oscillatory path across a lapping surface, said oscillatory path being parallel to a longitudinal axis of said transducer elements exposed at said air bearing surface;

maintaining said air bearing surface of said magnetic transducers in contact with said lapping surface for a first period of time during said oscillatory movement of said magnetic transducer, a lapping pressure being applied during said first period such that a substantial amount of material is abraded from said air bearing surface;

reducing said lapping pressure during a second period such that an insubstantial amount of material is abraded from said air bearing surface as said magnetic transducer moves with respect to said lapping surface;

during said second period, moving said lapping surface on a plane generally parallel with the air bearing surface, and not parallel to the direction of with said oscillatory path of said magnetic transducer; and reapplying said lapping pressure during a third period such that a substantial amount of material is abraded from said air bearing surface to obtain the desired dimension of said transducer elements.

2. A method as in claim 1, wherein said lapping plate is stationary during said first and said third periods.

3. A method as in claim 1, wherein said movement of said lapping surface during said second period is a rotational movement.

4. A method as in claim 1, wherein said movement of said lapping surface during said second period is a linear movement.

5. A method as in claim 1, wherein said movement of said lapping surface during said second period is a combination of a rotational movement and a linear movement.

6. A method as in claim 1, wherein said magnetic transducer includes a magnetoresistive read sensor, an edge thereof exposed at said air bearing surface.

7. A method as in claim 1, wherein each of the steps are repeated for a predetermined duration, such that less than two tenths of a micron of material is removed from said air bearing surface at the end of said predetermined duration.

8. A method as in claim 1, wherein said magnetic transducer moves away from a reference position during said first period, moves toward said reference position during said second period and again moves away from said reference position during said third period.

9. A method as in claim 8, wherein said reference position is determined by a position sensor.

10. In a process for batch fabricating magnetic transducers wherein said magnetic transducers are fabricated in rows on a wafer, each said magnetic transducer having a plurality of transducer elements exposed at an air bearing surface thereof, a method for lapping said air bearing surface to provide a desired height dimension for said transducer elements, comprising the steps of:

separating said wafer into row bars, each said row bar including at least one row of a plurality of said magnetic transducers;

moving said magnetic transducer in an oscillatory path generally parallel with a lapping surface, said oscillatory path being parallel to a longitudinal axis of said transducer elements exposed at said air bearing surface;

maintaining said air bearing surface of said magnetic transducers in contact with said lapping surface for a first period during said oscillatory movement of said magnetic transducer, a pressure being applied during said first period such that a substantial amount of material is abraded from said air bearing surface;

reducing said pressure during a second period such that an insubstantial amount of material is abraded from said air bearing surface during said second period as said magnetic transducer moves with respect to said lapping surface;

during said second period, moving said lapping surface on a plane parallel with said air bearing surface, and not parallel to the direction of with said oscillatory path of said magnetic transducer; and reapplying said pressure during a third period such that a substantial amount of material is abraded from said air bearing surface during said third period to obtain the desired dimension of said transducer elements.

11. A method as in claim 10 wherein said lapping surface is stationary during said first and said second periods.

12. A method as in claim 10 wherein said movement of said lapping surface during said second period is a rotational motion.

13. A method as in claim 10 wherein said movement of said lapping surface during said second period is a linear motion.

14. A method as in claim 10 wherein said movement of said lapping surface during said second period is a combination of a linear motion and a rotational motion.

15. A method as in claim 10, wherein said magnetic transducer includes a magnetoresistive read sensor, an edge thereof exposed at said air bearing surface.

* * * * *